C. W. GRAHAM.

PROCESS OF APPLYING GASKETS OR RING LINERS.

APPLICATION FILED JUNE 3, 1918.

Reissued Aug. 19, 1919.

14,709.

5 SHEETS—SHEET 1.

Inventor:
Charles W. Graham
By Munday, Clark & Carpenter Attys.

C. W. GRAHAM.

PROCESS OF APPLYING GASKETS OR RING LINERS.

APPLICATION FILED JUNE 3, 1918.

Reissued Aug. 19, 1919.

14,709.

5 SHEETS—SHEET 2.

Inventor:
Charles W. Graham
By Munday, Clarke
& Carpenter Attys.

C. W. GRAHAM.

PROCESS OF APPLYING GASKETS OR RING LINERS.

APPLICATION FILED JUNE 3, 1918.

Reissued Aug. 19, 1919.

14,709.

5 SHEETS—SHEET 3.

Inventor
Charles W. Graham
By Munday, Clark & Carpenter
Attys.

C. W. GRAHAM.

PROCESS OF APPLYING GASKETS OR RING LINERS.

APPLICATION FILED JUNE 3, 1918.

Reissued Aug. 19, 1919.

14,709.

5 SHEETS—SHEET 4.

Inventor
Charles W. Graham
By Shumway Clarke & Carpenter Attys

C. W. GRAHAM.

PROCESS OF APPLYING GASKETS OR RING LINERS.

APPLICATION FILED JUNE 3, 1918.

Reissued Aug. 19, 1919.

14,709.

5 SHEETS—SHEET 5.

Inventor.

Charles W. Graham

By Thurman, Clark & Carpenter Attys.

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

PROCESS OF APPLYING GASKETS OR RING-LINERS.

14,709. Specification of Reissued Letters Patent. Reissued Aug. 19, 1919.

Original No. 1,154,245, dated September 21, 1915, Serial No. 736,900, filed December 16, 1912. Application for reissue filed June 3, 1918. Serial No. 238,049.

DIVISION B.

*To all whom it may concern:*

Be it known that I, CHARLES W. GRAHAM, a citizen of the United States, residing in Allendale, in the county of Bergen and State of New Jersey, have invented a new and useful Improvement in Processes of Applying Gaskets or Ring-Liners, of which the following is a specification.

This invention relates in general to an improved method or process of applying gaskets or ring liners of paper or other delicate material to the seaming flanges of can ends such as are used in the manufacture of what are commonly termed "sanitary" or double seamed cans.

An object of the invention is to provide for the cutting of the gasket or annular liner from a web of paper or the like and for the application of the ring thus produced to the can end in such a manner that danger of deforming the ring or tearing it is minimized.

The invention in this particular contemplates a positive conveyance of the cut liner to the can end without depending upon gravity and without transferring the liner from one conveying member to another.

A further object of the invention is the provision of a simple method or process for accomplishing this result which will consist in a minimum number of steps and which can be carried on by ganged machines.

I am aware that prior to my invention attempts have been made to provide annular gaskets in seaming flanges of can ends but considerable difficulty has been experienced by reason of the light, delicate and fragile nature of the gasket forming material.

Other objects and advantages of the invention will be apparent as it is better understood from the following description of a preferred embodiment of the invention and also of a machine or mechanism adapted for this accomplishment.

Figure 2:
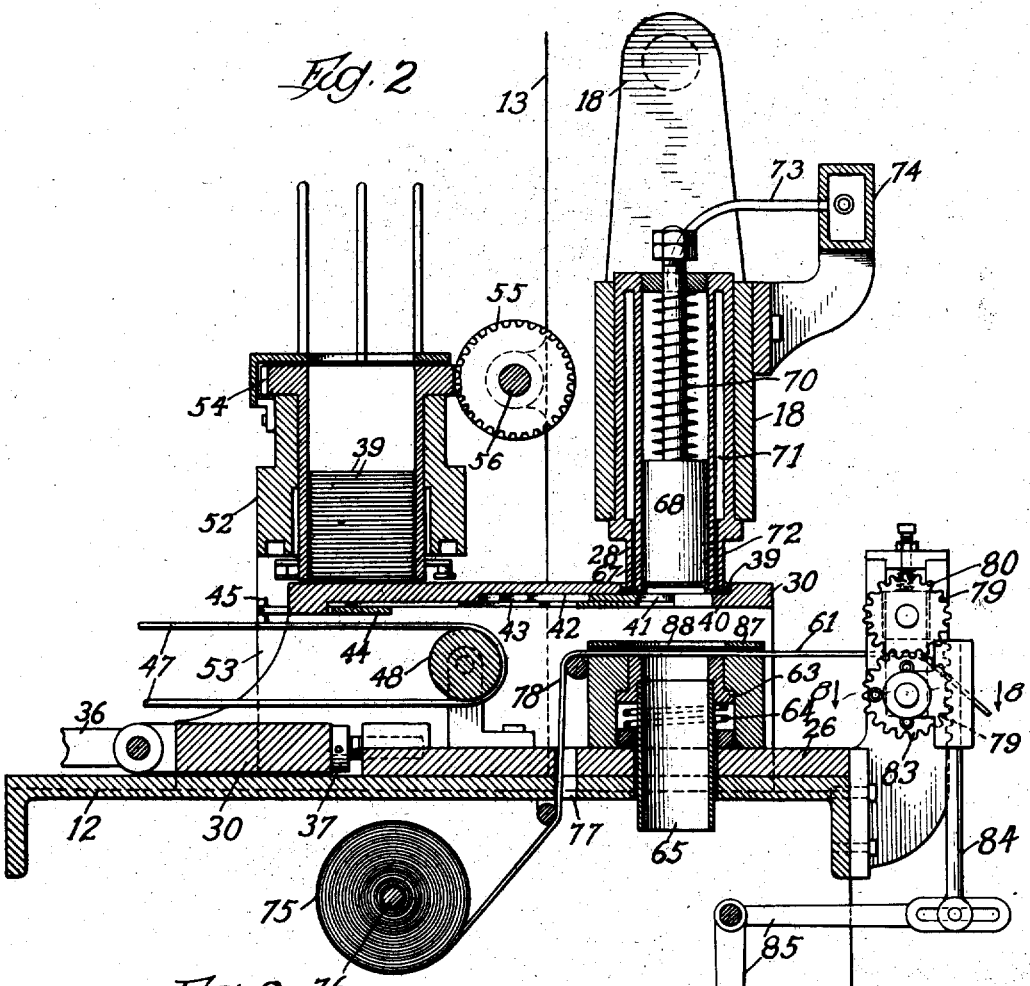
Fig. 2 is a partial vertical section taken substantially on the line 2—2 of Fig. 1.
Figure 8:
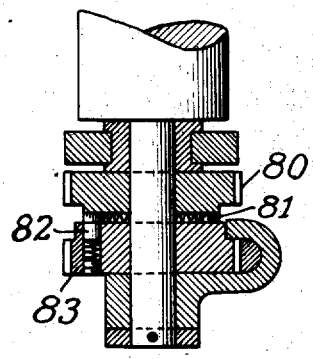
Figure 3:
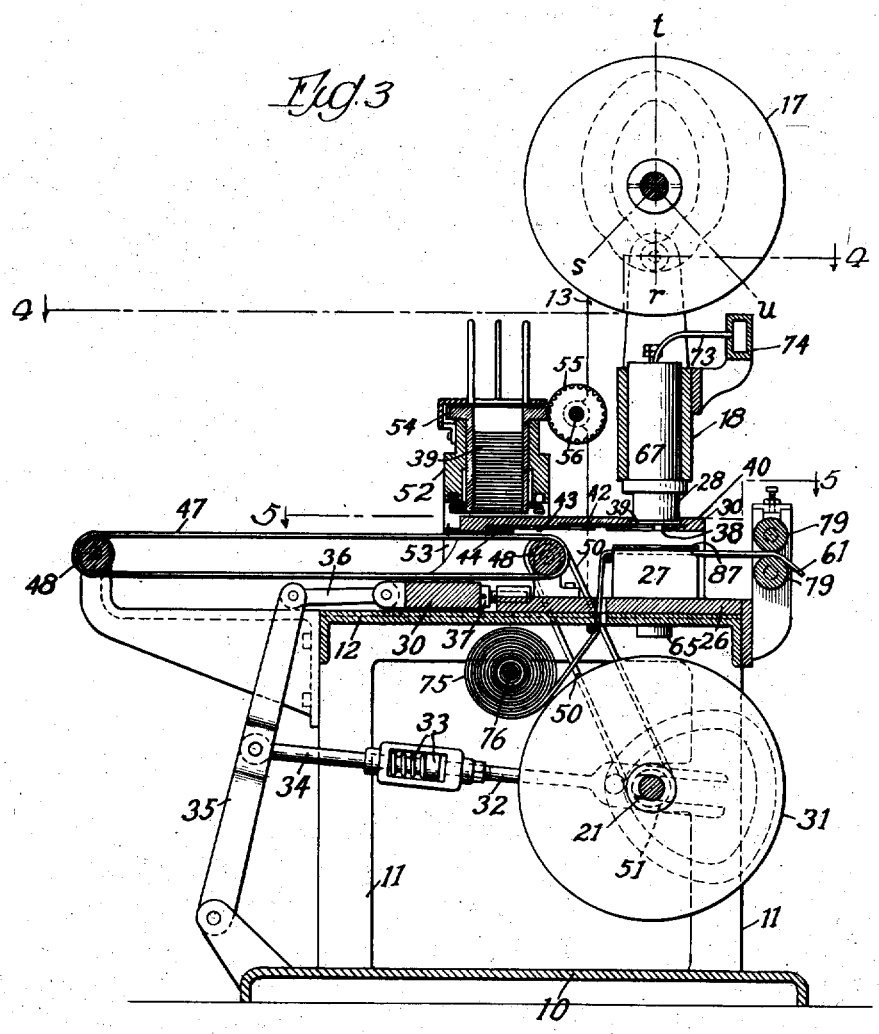
Fig. 3 is a transverse vertical section taken substantially on the line 3—3 of Fig. 1.
Figure 9:
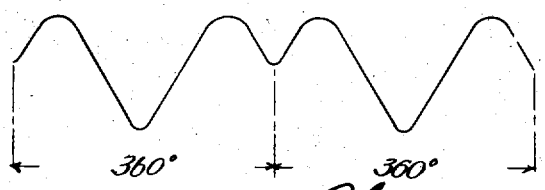
Figure 4:
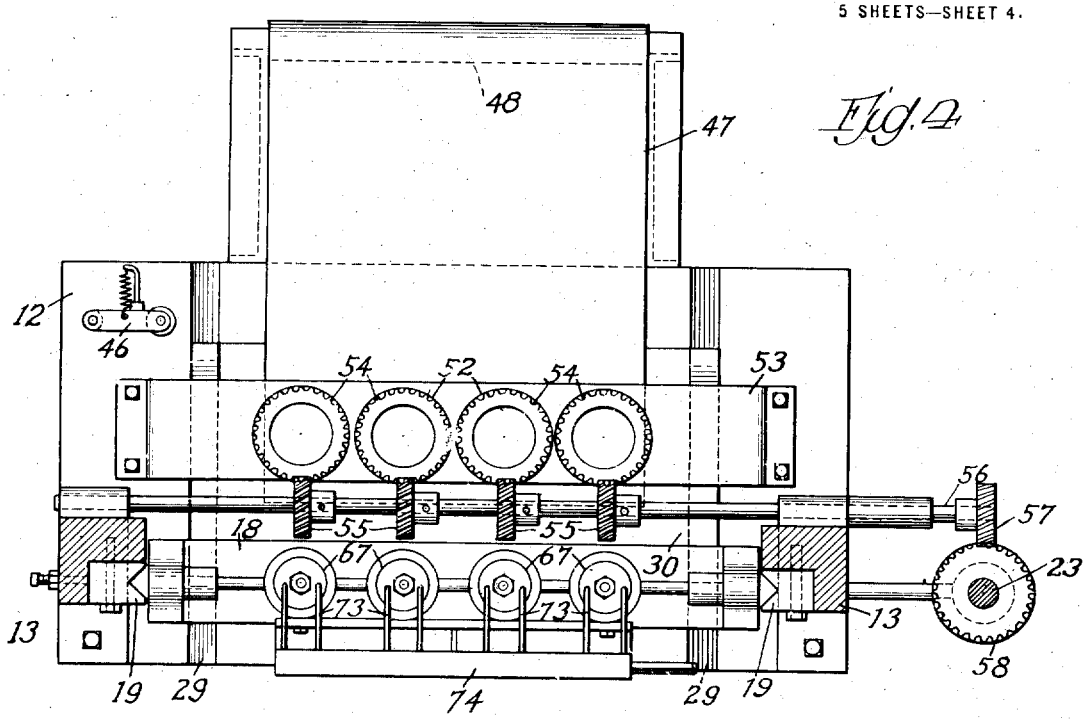
Figure 5:
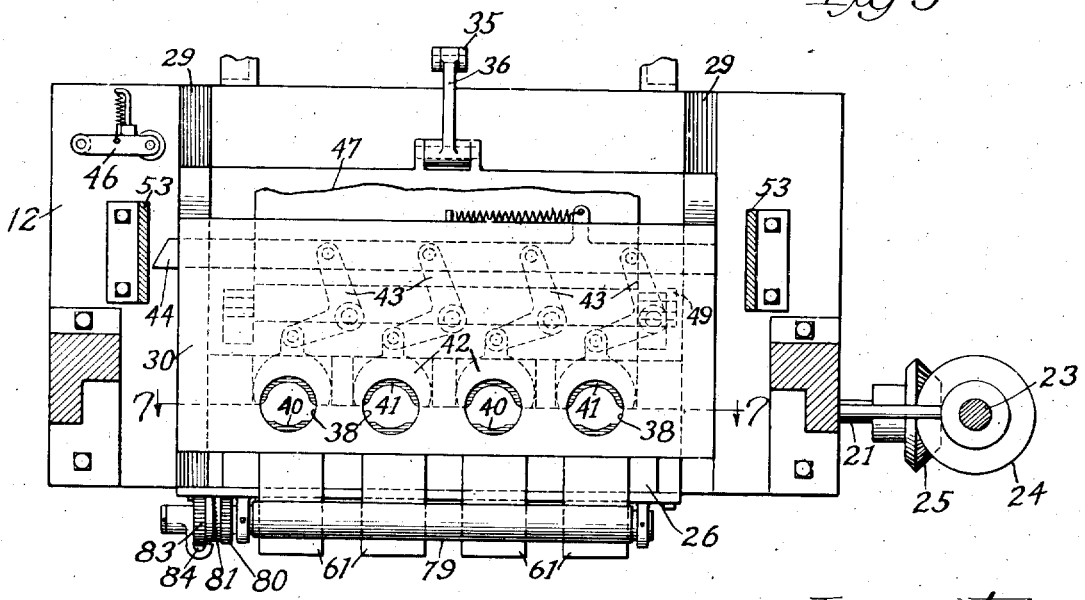
Figure 6:
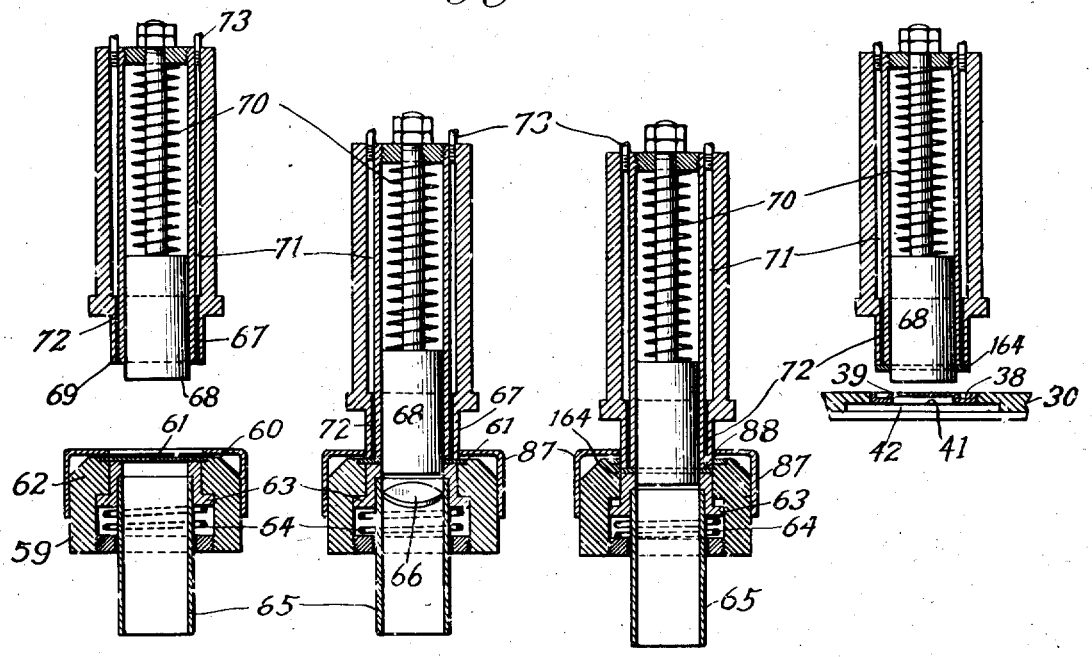
Figure 7:
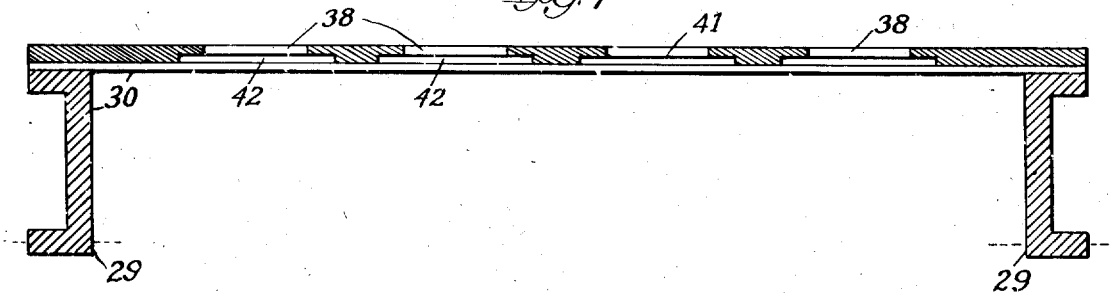

Figs. 4 and 5 are horizontal, sectional views taken respectively on the lines 4—4 and 5—5 of Fig. 3;

Fig. 6 comprises a plurality of vertical, sectional views of the compound punch and die mechanisms;

Fig. 7 is a longitudinal, vertical, sectional view of the multiple can end carrier detached and is taken substantially on the line 7—7 of Fig. 5;

Fig. 8 is a detail, sectional view, taken substantially on the line 8—8 of Fig. 2; and Fig. 9 is a diagrammatic view, illustrating two complete cycles of movements of combined punches and cutters, as controlled by their operating cams.

In the drawings, the machine as shown comprises a base plate 10, having upright standards 11 and a horizontal bed 12. Extending upwardly from the bed 12 on opposite sides thereof are a pair of uprights 13, the same being provided at their upper ends with suitable journal boxes 14, in which is mounted a power shaft 15, driven from any suitable source (not shown) as by means of a pulley 16. Fixed on said shaft 15 are a pair of cams 17, more particularly hereinafter described, which are adapted to reciprocate a cross head 18, mounted in guides 19 secured on the uprights 13. Secured to the end of the shaft 15 is a bevel gear 20, which is adapted to operate a main driving shaft 21, extending longitudinally of the machine, through the intermediary of bevel gear 22, vertical shaft 23 and bevel gears 24 and 25. Mounted on the bed 12 is a bolster plate 26 which supports a plurality of compound dies 27, with which coöperate a corresponding number of compound punches 28 mounted in the cross head 18, the number of said compound dies and compound punches shown in the drawing being four, but it will be understood that more or less may be employed, if desired. Reciprocally mounted on the bed 12 in ways 29 is a multiple can end carrier 30, operated from a cam 31 on the shaft 21, through a forked rod 32, having a roller engaging in the groove of the cam 31, said rod 32 having a yieldable connection 33 with a second rod 34 pivotally connected to a lever arm 35, which in turn has pivoted thereto at its outer end a link 36, pivoted to the rear side of the carrier 30.

As more clearly shown in Fig. 2, the bolster plate 26 is provided with a threaded, adjustable stop 37 by which the carrier is brought to rest at the end of its forward stroke, to thereby properly position the can ends carried by it in alinement with the punches and dies, as hereinafter described, any excess movement of the carrier which would be imparted to it by the cam 31 being taken up by the yieldable connection 33. The carrier 30 is provided with a plurality of circular pockets 38 (Fig. 5), the number of said pockets corresponding to the number of the dies and punches, each pocket being of a diameter large enough to permit can ends 39 to pass therethrough, and each being provided with a stationary segmental ledge 40 and a retractable segmental ledge 41, formed on an arcuate member 42 pivotally connected to and operated by a bell crank 43, all of the bell cranks 43 being in turn pivotally connected to an operating bar 44, longitudinally slidable on the carrier and held in normal position by spring 45, but adapted to be operated by a spring-controlled, pivotally mounted trip 46 on the bed 12, as the carrier is retracted.

Figure 1:
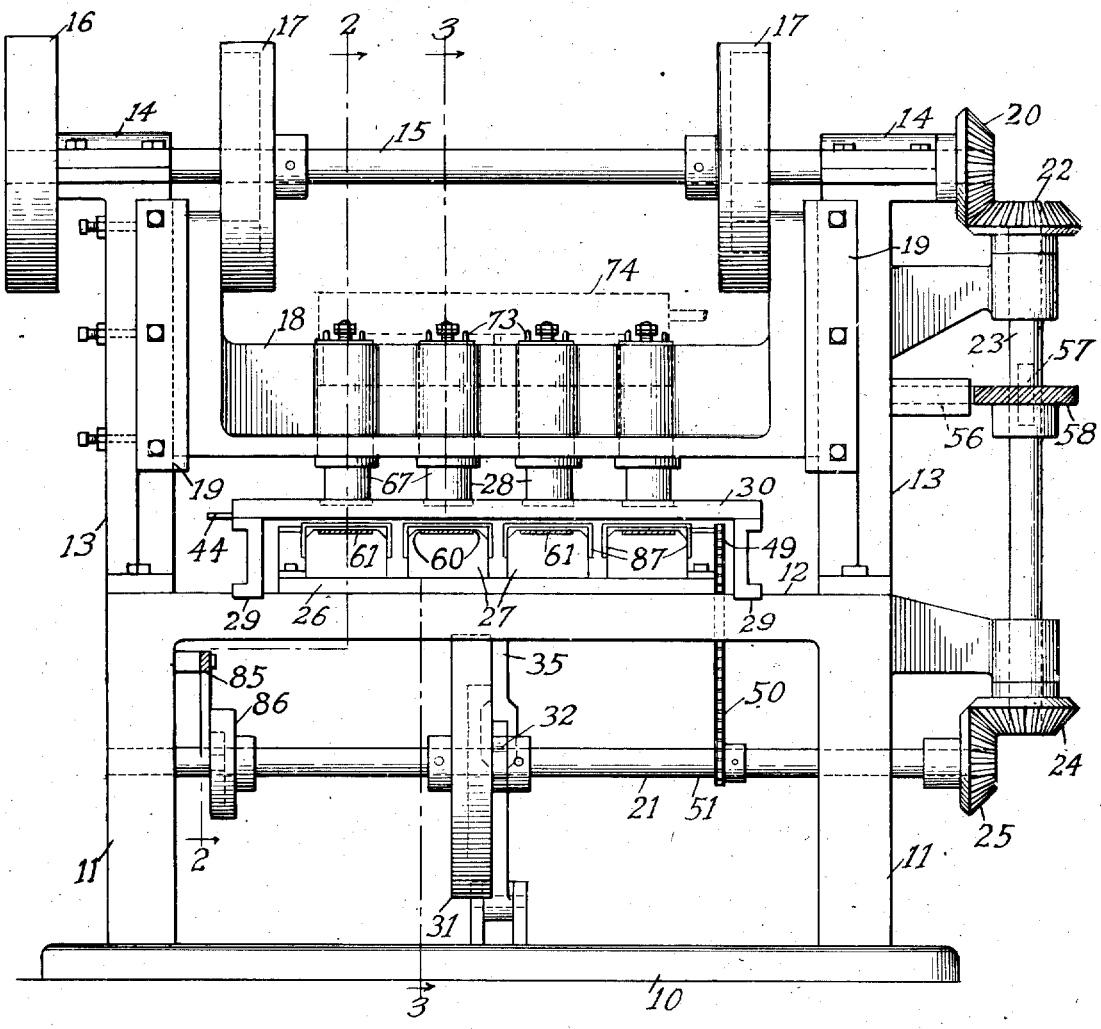
Figure 1 is a front elevation of a machine adapted for the producing of a process embodying my invention.

From the foregoing description, it will be seen that can ends which are fed to the pockets 38 will be held in position therein until the operating bar 44 engages the trip 46, whereupon all the can ends will be released simultaneously and allowed to drop onto an endless belt conveyer 47 (Fig. 3), mounted on suitably supported rollers 48 and adapted to be driven by means of a sprocket gear 49 (Fig. 1), secured to the end of one of the rollers, said sprocket gear 49 being driven by means of a sprocket chain 50, running over a sprocket gear 51, secured to the shaft 21. The cam 31 is so designed that the carrier 30 is given a dwell or period of rest at each end of its reciprocation, and while in its rearmost position, a plurality of can ends are adapted to be fed from stacks and dropped into the pockets 38 simultaneously, by means of a plurality of feeding mechanisms 52 mounted on a bridge 53, extending over the carrier 30, said feeding mechanisms 52 each including a spiral gear 54 operated by means of corresponding spiral gears 55, mounted on a longitudinally extending shaft 56, driven by means of a spiral gear 57 on the end thereof, and which meshes with a spiral gear 58 secured to the vertical shaft 23.

By referring to Fig. 6, it will be seen that each compound die comprises a stationary, outer member 59, having a guideway 60 therein on its upper face, for a web 61 of paper or other suitable fibrous gasket forming material. Slidably mounted in a circular recess 62, formed in the member 59, is an annular female die 63, normally held in its uppermost position by a spring 64, the upper face of the die 63 being normally flush with the bottom of the guide 60, so that the web 61 lies flat thereon. Secured to the female die 63, and movable therewith, is a discharge tube 65, down which the circular disks 66, punched from the web of gasket material, are adapted to pass and be discharged from the machine.

Each punch 28, coöperating with a die 27, comprises an outer, annular cutting member 67, and a perforating punch 68 slidably mounted within the annular cutting member 67 and normally projected in advance of the cutting face 69 of the member 67 by means of a spring 70. The annular gasket or ring liner is cut from the web of gasket material 61 as follows: As the compound punch descends, the perforating member 68 thereof, being in advance, will first punch out a circular disk 66 from the web by passing into the annular female die 63, as shown in view *b* of Fig. 6, and as the descent of the compound punch continues, the face 69 of the annular cutting member 67 will engage the uncut portion of the web and press the female die 63 down with it against the action of the spring 64, thereby cutting an annular gasket 164 from the web, as shown in view *c*, Fig. 6. As the compound punch is started on its up-stroke, the female die 63 will move upwardly therewith, thus serving to positively retain the cut ring against the face 69 of the annular cutting member until the female die 63 reaches its uppermost normal position. Upon the continued upward movement of the compound punch, the ring liner will be carried thereby since the same will be held by frictional contact to the outside of the perforating punch 68, as shown in view *d*, Fig. 6.

Although not essential to the successful operation of my mechanism, the annular cutting member 67 of each punch may be provided with a chamber 71, having a plurality of passageways 72 leading therefrom to the cutting face 69 and the chamber connected by means of short pipes 73 to a chamber 74 mounted on the cross head 18, said chamber 74 being common to all of the punches and being connected to a combined vacuum and blast pump (not shown), so regulated that a vacuum is created in the chambers of the punches during the up-stroke, and an increased pressure or blast caused at the end of the short down stroke of the punch when the gasket is being assembled with the can end, as hereinafter described.

The webs of paper or other fibrous material are supplied from rolls 75, mounted on a transversely extending shaft 76, there being a separate roll of material for each set of punches and dies. The web passes through a slot 77 in the bed 12 and bolster plate 26, over a roller 78, along the guide 60, and is pulled or fed intermittently by the following arranged mechanism. The strap of the web passes between two rollers 79, 79 longitudinally (Fig. 3) arranged on the front of the machine and common to all the webs being fed, said rolls being mounted in suitable journal boxes, one of which is preferably adjustably and yieldably mounted, as shown in Fig. 2. The ends of the shafts supporting the rollers 79 are provided with meshing gears 80, the lower one of which is provided with a ratchet face 81 (see Fig. 8) and rotated step by step by means of a spring pressed pawl 82 located in a gear 83, rotatably mounted on the extended shaft of the lower roller 79, and oscillated by means of a rack bar 84, which receives a reciprocating movement by means of a bell crank lever 85 from a cam 86 mounted on the operating shaft 21, the cam 86 being so timed that the webs of paper will be pulled through the dies while the punches are in elevated position. As shown in Fig. 6, each die is provided with a plate 87, provided with a suitable opening 88, through which is adapted to pass the compound punch, said plate preventing the lifting up of the scrap of the web of gasket material during the upstroke of the punch and serving as a stripper.

The operation of the machine during a complete cycle is as follows: Starting with the parts in the position as shown in Fig. 3, in which position the gasket is just being deposited in a can end 39, a continued rotation of the cams 17 in the direction indicated by the arrow *x* through the angle included between the radial lines *r* and *s* will lift the cross head 18, carrying the punches 28 therewith, a distance corresponding to that between the points R and S on the diagrammatic outline of the cam shown in Fig. 9. Immediately after the punches are started on this part of their short upstroke, the carrier 30 will be retracted, during which movement the assembled can ends and gaskets will be released, as hereinbefore described, and the carrier finally brought to a position where the can end pockets 38 are in alinement with the feeding devices 52, and the carrier will then have a period of rest long enough to permit of the deposition of the can ends in the pocket. As the cams 17 continue to rotate through the angle between the radial lines *s* and *t* (Fig. 3), the cross head 18 will descend an amount corresponding to the distance indicated between the points S and T on the diagrammatic outline, Fig. 9. During this downstroke, the perforating and cutting operations will take place in the manner described in connection with the detailed description of the compound punches and compound dies. Upon the continued rotation of the cams 17 through the angle between the radial lines *t* and *u*, the cross head will be raised as indicated by the line between the points T and U, in Fig. 9, and during this upward movement, after the punches have been raised above the level of the top of the carrier 30, the latter will begin to move forward, carrying with it the can ends or closures which have been deposited in the pockets 38. During this upward movement of the cross head and punches, the paper web 61 will be fed through the dies 27 to thereby position a new portion of the web in position for another gasket to be cut therefrom. Upon the cams 17 continuing their rotation an amount corresponding to the angle between the radial lines *u* and *r*, the cross head with the punches will descend the length of the short stroke and the gaskets carried by the punches will be deposited in the can ends on the carrier, which will have been brought to rest prior to the punches reaching their lowermost point in the short down stroke. This movement of the cross head and punches is denoted in Fig. 9 by the line between the points U and R. As will be understood, the foregoing cycle of operations will be repeated for each complete rotation of the cams 17.

It will be manifest from the foregoing that the gaskets or ring liners are given a minimum opportunity to become torn or injured between the time that they are cut from the web of paper and the time they are assembled in the can end.

I might mention further in detail that can ends lined by my process are of special contour and shape and are specifically adapted to form interfolded hermetic joints with flanged can bodies, thus producing what is known in the art as sanitary cans. The peripheral edge of the can ends constitutes an outstanding seaming flange surrounding a shouldered portion.

The liner rings are placed on this seaming flange with the shouldered portion extending through the central opening of the liner rings. In assembling can ends, thus lined with flanged can bodies, the shouldered portions of the can ends pass into the openings of the can bodies, and the liners carried on the flanges of the can ends lie in contact and on top of the flanges of the can bodies in proper position to be fully inclosed within the folds of the interlocking flanges as they are being formed into the well known double seam.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof. I do not claim herein the apparatus which is described and illustrated, the same being the subject matter of my reissue application 230,805, filed April 25, 1918, of which this present application is a division.

I claim:

1. A process of lining can ends which consists in first simultaneously cutting a liner from a web of suitable material and securing said liner in safe position and maintaining control of it individually, and reciprocating said liner without moving it edgewise and delivering said liner onto a can end before releasing it.

2. A process of lining can ends, which consists in punching a ring liner from and through a flat piece of paper or the like material, holding and maintaining said liner in a flat condition in planes parallel with the plane of said material while removing said liner away from the plane of cutting and in a direction at right angles to said plane, introducing an unlined can end into the path followed by said ring liner as it was so removed, and moving said liner back in said path and setting it against a face of said can end.

3. A process of lining can ends, which consists in punching a ring liner in an axial direction by making two separate and concentric cuts at one operation in and through a piece of flat material such as paper or the like, withdrawing the ring liner in an axial direction from said material, placing an unlined can end in the path of said ring liner, and then returning the ring liner along the same axial line and path and applying it to said can end.

4. A process of lining can ends, which consists in punching a ring liner from a piece of flat material such as paper by making at one operation two separate spaced-apart cuts through said material, then withdrawing the cut liner away from the plane of said material, then placing a flanged can end in the path of said ring liner, and then returning the ring liner along the same path and applying it on to the flange of said can end.

5. A process of forming and applying annular gaskets to the flanges of shouldered can ends, comprising the following steps: moving flat, thin and flexible gasket material between gasket forming elements, moving one of said forming elements to engage said flat material and form an annular gasket therefrom, maintaining said engagement of said gasket after forming to hold it in positive control, moving said formed gasket away from said place of forming by means of one of said forming elements, moving a flanged and shouldered can end into axial alinement with said gasket while held and controlled by the latter forming element, and then moving said gasket axially and passing it around the shoulder and on to the flange of said can end.

6. A method of forming, controlling and applying annular flat gaskets to the flanges of shouldered can ends, consisting of the following steps: moving a web of thin, flexible and flat gasket material between axially alined forming elements, bringing said forming elements together to engage said web of gasket material, and while so engaged forming therefrom an annular gasket, maintaining engagement of said gasket by one of said elements by means of frictional contact with an edge of said formed gasket, moving said forming element with said gasket away from said place of forming, moving a shouldered and flanged can end into assembling alinement with said gasket while engaged and held by said forming member, and then moving said gasket out of the engagement and control of said member and passing it around the shoulder and on to the flange of the said positioned can end.

7. A method of forming, controlling and applying annular flat gaskets to the flanges of shouldered can ends, consisting of the following steps: moving a web of thin flexible flat gasket material between axially alined forming elements, bringing said forming elements together into contact with said web, whereby a portion of said web is perforated and severed and an annular ring gasket formed therefrom, one of said forming elements entering within the central opening of said annular ring gasket and frictionally engaging the inner edge thereof and thereby maintaining positive control of the gasket and positively holding said gasket against distortion or displacement while moving the same away from said place of forming, moving a shouldered and flanged can end into assembling relation with said annular gasket, and then causing the shoulder of said can end to enter the central opening of said gasket and the gasket to be released by said control and to be seated on the flange of said can end.

CHARLES W. GRAHAM.